July 23, 1935.  F. A. FOWLER  2,008,951
COASTER WAGON
Filed March 5, 1934
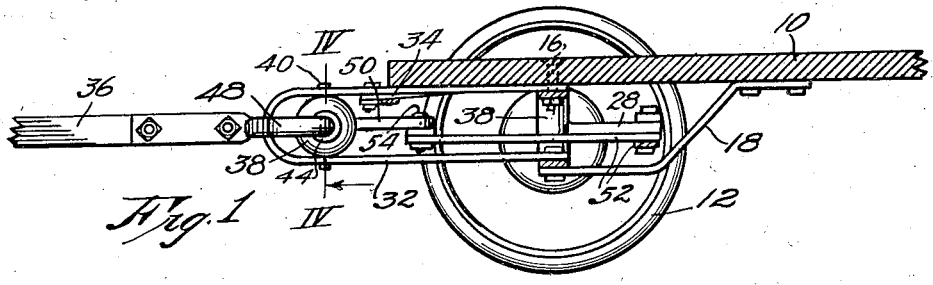
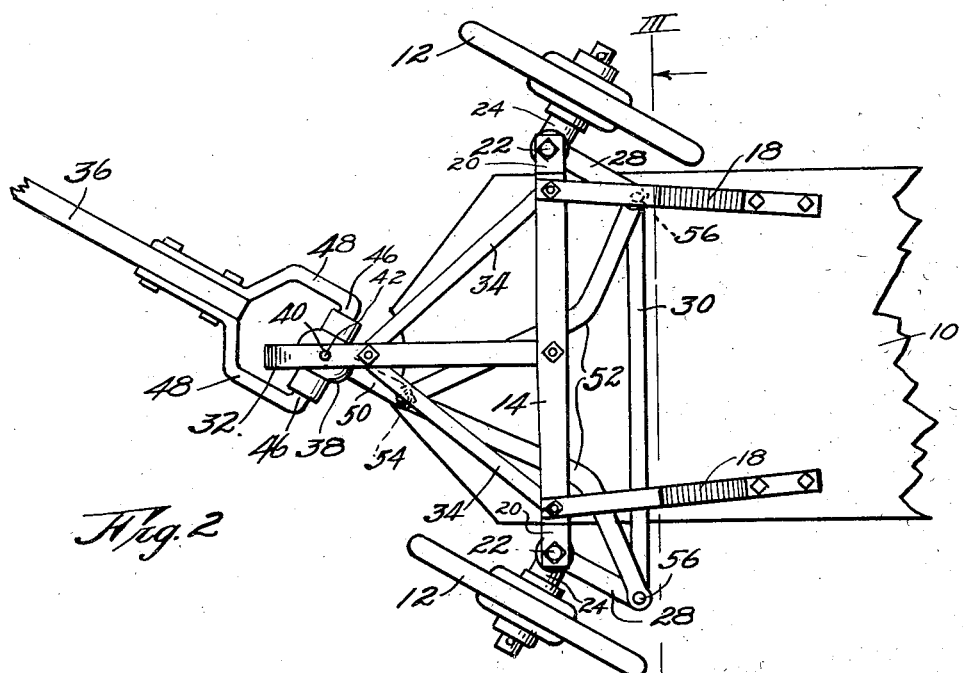
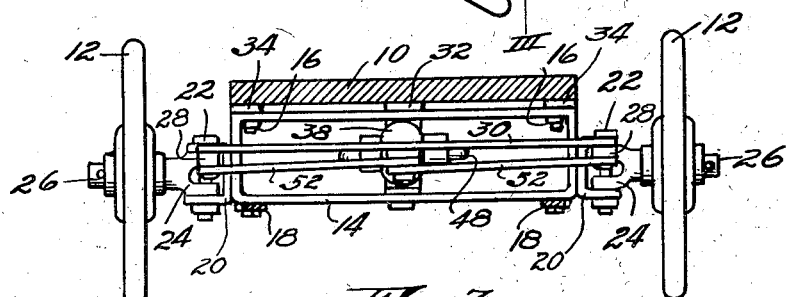
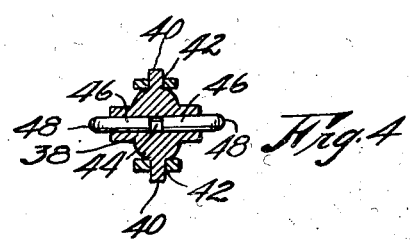
INVENTOR.
Frank A. Fowler
BY
Hovey & Hamilton,
ATTORNEYS.

Patented July 23, 1935

2,008,951

UNITED STATES PATENT OFFICE 2,008,951

COASTER WAGON

Frank A. Fowler, Kansas City, Mo.

Application March 5, 1934, Serial No. 714,125

5 Claims. (Cl. 280—87.5)

This invention relates to wagons and particularly to coaster wagons having a pivot or automobile spindles for the steering wheels.

The principal object of this invention is the provision of a coaster wagon having new and novel steering mechanism whereby a minimum movement of the steering tongue is required, and whereby the stability of the wagon is greatly increased.

A further object of the present invention is the provision of coaster wagons having steering mechanism including a tongue pivotally mounted for vertical oscillation to a forwardly disposed tongue supporting member that is stationary relative to the wagon body.

Other objects are simplicity and economy of construction, ease and safety of operation, and adaptability for use when in the inverted position.

With these objects in view, as well as other objects which will appear during the course of the specification, reference will now be had to the drawing, wherein:

Figure 1 is a fragmentary, sectional elevation of a coaster wagon showing the front end thereof and embodying this invention.

Fig. 2 is an inverted view of the front portion of the wagon showing the steering mechanism in position to make a turn.

Fig. 3 is a vertical, sectional view taken on line III—III of Fig. 2, and,

Fig. 4 is a section taken on line IV—IV of Fig. 1.

Like reference characters refer to similar parts throughout the several views and the numeral 10 designates a wagon bed of any desired type, mounted at its front end on the steering wheels 12. While the rear portion of the wagon is not shown, however it is apparent that any of the conventional types might be used, including the usual two wheel form or a single wheel positioned in the center of the wagon. A rigid bolster structure 14 is securely attached to body 10 by bolts 16 and brace arms 18. The bolster is preferably of an open rectangular form to allow free and unobstructed movement of certain of the steering parts therethrough. At each end of bolster 14 is a bracket 20, which may be integral therewith or attached thereto by welding, riveting, etc. pivotally mounted to each bracket 20 by means of substantially vertically disposed pins 22 are stub axles 24, having wheel spindle 26 on which wheel 12 is mounted. The stub axle is also provided with a rearwardly extending operating or steering arm 28 which is disposed at a right angle to spindle 26. Arms 28 at opposite sides of the wagon are of equal lengths and are connected together by means of a connecting bar 30 which maintains the wheels 12 in substantially parallel relation during the operating of the wagon.

Extending forwardly of the bolster 14 at the center line of the wagon is a U-shaped member 32 which is secured rigidly to the bolster 14 by means of bolts and brace bars 34 as clearly shown in Figs. 1 and 2. The closed end of 32 extends beyond the outer portion of bed 10 and serves as a support for the tongue 36 through the intermediacy of a hub member 38 which is pivoted for horizontal oscillation by trunnions 40 passing through holes 42 formed in the legs of 32. A horizontal hole 44 extending through 38 is adapted to receive the inturned ends 46 of the bifurcated portions 48 of tongue 36.

It is apparent that as described above the wagon tongue is connected to the stationary member 32 by means of a universal joint or coupling so that the center line of the tongue always passes through the vertical central plane of the wagon at a given point, thus permitting an entirely different movement than is obtained in the usual form where the tongue is mounted on a hound that is pivotally mounted at the front axle.

Carried by hub 38 is a rearwardly extending lever 50 connected with the arms 28 in such a manner as to always maintain arms 28 in substantially parallel relation with lever 50 during the steering of the wagon. Pin 54 pivots links 52 to lever 50 while pins 56 serve to pivot links 52 and bar 30 to the respective arms 28. To facilitate proper movement of the wheels 12 during the turning of the wagon, links 52 are bent so as to properly clear certain of the bolster parts. In view of the fact that the bolster securely supports the wagon bed at its outer edges and the actual front wheel support varies only slightly regardless of the angle of the turn, the tendency of the wagon to turn over is greatly eliminated.

By pivoting the tongue through the intermediacy of a member pivoted forwardly of the bolster to a relatively stationary bracket, it is evident that the movement of the tongue in the steering operation is reduced to a minimum, thereby facilitating rapid and accurate control of the wagon during the coasting operation. It is obvious that when coasting the operator may hold the tongue in substantial alignment with the axis of hub 38, and steer the wagon by simply rotating the handle about this axis, furthermore, when the tongue is inclined slightly from this position it moves on a proportionately small radius.

This ease, accuracy and safety of steering is due to the specific positioning and interconnecting of the parts and cannot be obtained where the support for the tongue is pivoted at the bolster, thus necessitating the movement of the inner end of the tongue from one side of the center of the wagon to the other during the steering operation.

It is contemplated that this wagon when constructed as shown may be operated in either the upright position or in the position shown in Fig. 2. When used in the inverted position, the moving parts might be covered with a suitable flooring.

When the wagon is being pulled it is evident that the wheels will be properly controlled to always be in substantially parallel relation with the general forward direction of the tongue.

What I claim is:

1. A wagon having a body; a bolster rigidly secured to said body; a tongue supporting member projecting forwardly of said body and carried in fixed relation thereto; a steering wheel spindle pivotally mounted at each end respectively of said bolster; a steering arm extending rearwardly from each of said spindles; a bar connecting said steering arms; a lever pivotally mounted for oscillation in said tongue supporting member; a tongue mounted for pivotal movement on said lever; and means interconnecting said steering arms and lever to oscillate said steering wheel spindles as the tongue is moved, comprising a link extending from each steering arm respectively to a common point on said lever forwardly of said bolster and intersecting the latter.

2. A wagon having a body; a bolster rigidly secured to said body; a tongue supporting member projecting forwardly of said body and carried in fixed relation thereto; a steering wheel spindle pivotally mounted at each end of said bolster; a steering arm extending rearwardly from each of said spindles; a bar connecting said steering arms; a lever pivotally mounted for oscillation in said tongue supporting member in front of said body; links interconnecting said lever with each of said steering arms respectively; and a tongue adapted to oscillate said lever.

3. A wagon having a body; a bolster rigidly secured to said body; a tongue supporting member projecting forwardly of said body and carried in fixed relation thereto; a steering wheel spindle pivotally mounted at each end of said bolster; a steering arm extending rearwardly from each of said spindles; a bar connecting said steering arms; a rearwardly extending lever pivotally mounted for oscillation on said tongue supporting member; links interconnecting said lever with each of said steering arms respectively; and a tongue adapted to oscillate said lever.

4. A wagon having a body; a bolster rigidly secured to said body; a tongue supporting member secured rigidly to said bolster and extended forwardly therefrom; separate steering wheel spindles carried by said bolster; a steering arm extending rearwardly from each of said spindles; a rearwardly extended lever mounted for horizontal oscillation in said tongue supporting member; a bar interconnecting said steering arms; links interconnecting said lever and steering arms respectively; whereby said lever and arms are maintained in parallel relation; and a tongue adapted to oscillate said lever.

5. A wagon having a body; a bolster on the body; separate steering wheel spindles carried by said bolster; a tongue supporting member rigidly carried by said body; a steering arm carried by each of said spindles; a bar interconnecting said steering arms; a lever mounted for horizontal oscillation in said tongue supporting member in front of said body; a link interconnecting said lever with each of said steering arms respectively; and a tongue adapted to oscillate said lever.

FRANK A. FOWLER.